(12) United States Patent
Zhang

(10) Patent No.: US 9,174,662 B2
(45) Date of Patent: Nov. 3, 2015

(54) BRAKE DEVICE AND CHILD CARRIER PROVIDED WITH THE SAME

(71) Applicant: Wonderland Nurserygoods Company Limited, Central (HK)

(72) Inventor: Xiao-Jian Zhang, Central (HK)

(73) Assignee: WONDERLAND NURSERYGOODS COMPANY LIMITED, Central (HK)

( * ) Notice: Subject to any disclaimer, the term of this patent is extended or adjusted under 35 U.S.C. 154(b) by 313 days.

(21) Appl. No.: 13/783,678

(22) Filed: Mar. 4, 2013

(65) Prior Publication Data

US 2013/0320641 A1 Dec. 5, 2013

(30) Foreign Application Priority Data

May 30, 2012 (CN) .......................... 2012 1 0173735

(51) Int. Cl.
*B62B 9/08* (2006.01)
*B62B 5/04* (2006.01)

(52) U.S. Cl.
CPC ............... *B62B 9/082* (2013.01); *B62B 5/0433* (2013.01); *B62B 5/0461* (2013.01); *B62B 9/087* (2013.01)

(58) Field of Classification Search
CPC combination set(s) only.
See application file for complete search history.

(56) References Cited

U.S. PATENT DOCUMENTS

| | | | |
|---|---|---|---|
| 6,308,805 B1 * | 10/2001 | Lan | 188/20 |
| 7,059,452 B2 * | 6/2006 | Chen | 188/20 |
| 2004/0178025 A1 * | 9/2004 | Zweideck | 188/2 F |
| 2010/0308553 A1 * | 12/2010 | Li et al. | 280/47.38 |

* cited by examiner

*Primary Examiner* — John Walters
*Assistant Examiner* — Hilary L Johns
(74) *Attorney, Agent, or Firm* — Pearl Cohen Zedek Latzer Baratz LLP

(57) ABSTRACT

A brake device is disposed at a child carrier including a frame and at least one wheel unit that includes a hub and a plurality of spokes radiating from the hub. The brake device includes a base unit, an operable unit, a brake unit, and a positioning unit. The base unit is connected to the frame and is formed with a first guiding groove and a through hole. The operable unit is pivotally connected to the base unit and includes at least one side wall formed with a positioning hole and a second guiding groove. The brake unit is disposed slidably in the first and second guiding grooves. The positioning unit is disposed in the through hole and includes a positioning component and an elastic member elastically abutting against the positioning component.

22 Claims, 9 Drawing Sheets

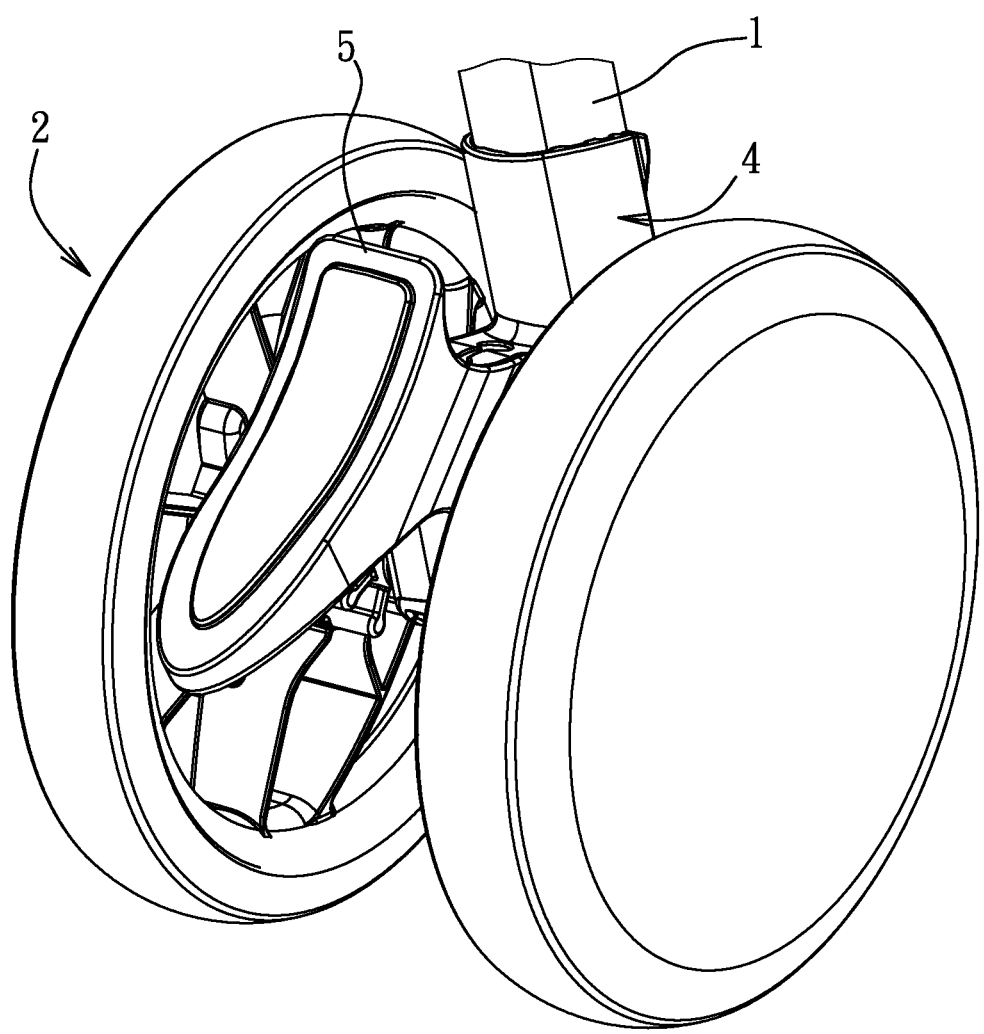
F I G. 1

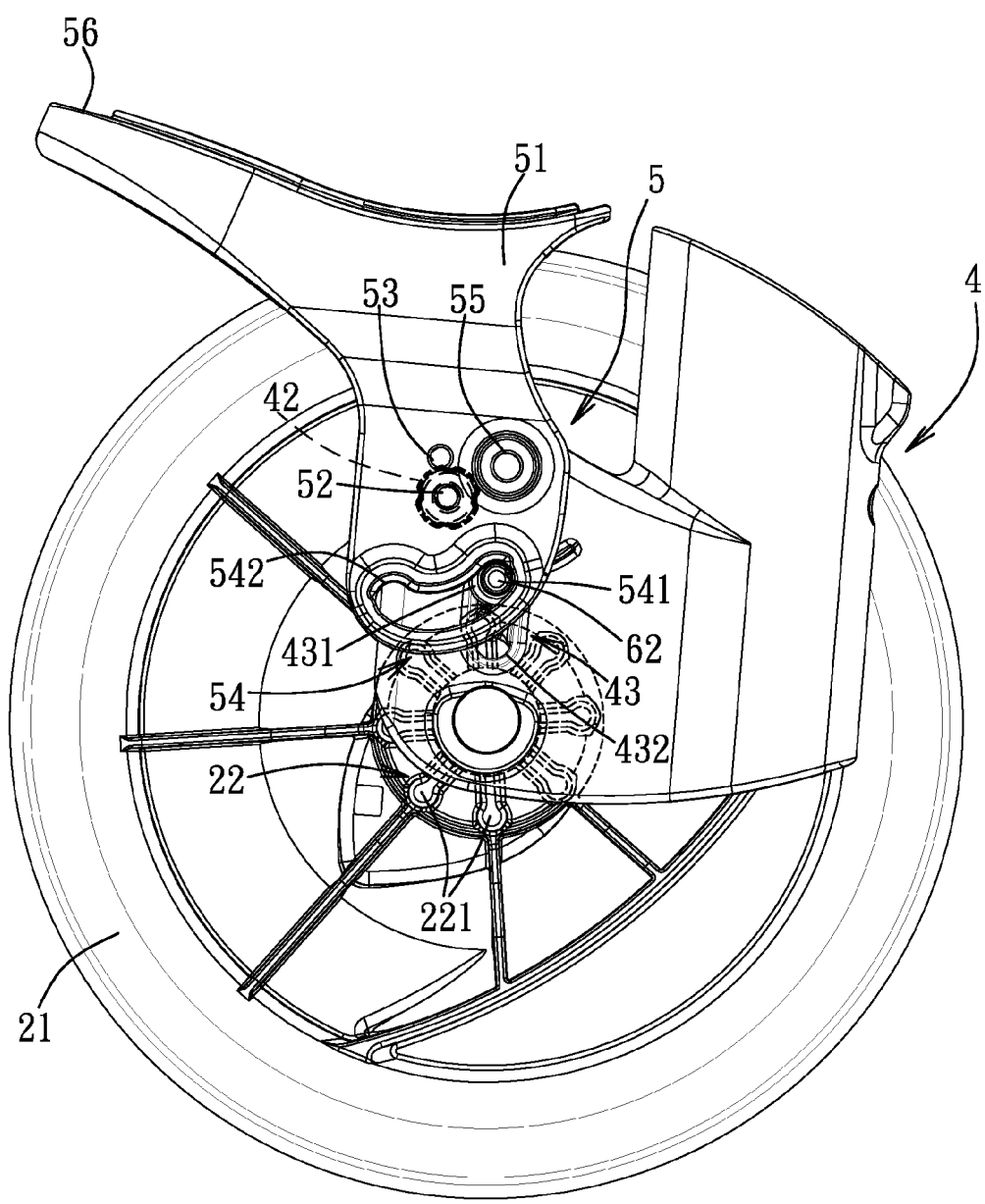
F I G. 7

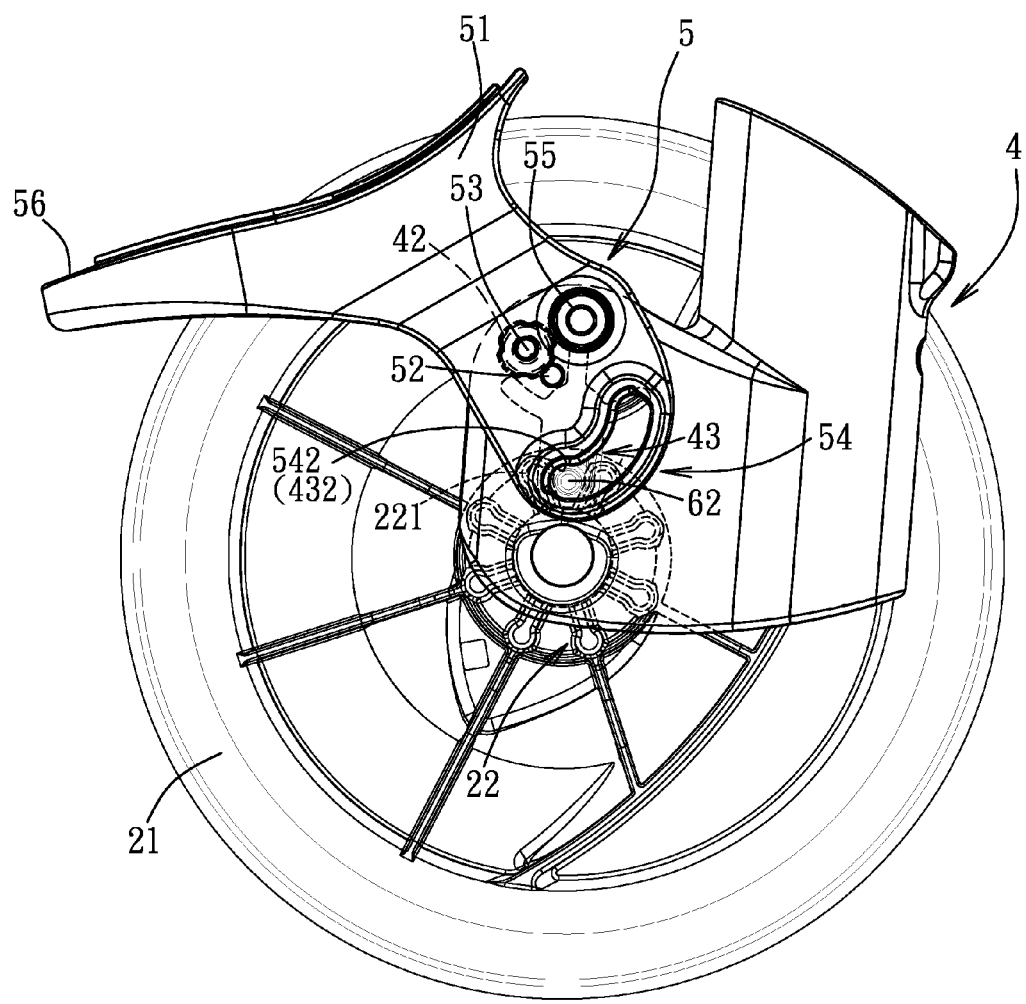
F I G. 9

BRAKE DEVICE AND CHILD CARRIER PROVIDED WITH THE SAME

CROSS-REFERENCE TO RELATED APPLICATION

This application claims priority of Chinese patent application no. 201210173735.5, filed on May 30, 2012.

BACKGROUND OF THE INVENTION

1. Field of the Invention

This invention relates to a brake device, more particularly to brake device for a child carrier.

2. Description of the Related Art

Generally, a child carrier (e.g., a stroller) includes a wheel provided with a conventional brake device in the form of a brake pedal. A user steps on the brake pedal to make a brake stick move into and be disposed between adjacent two of spokes of a hub of the wheel so as to lock the wheel of the child carrier and stop the child carrier. However, when the user steps on the brake pedal, the brake stick may not be completely moved into engagement with the spokes. If the user releases the brake pedal while the wheel of the child carrier is not completely locked, a baby on the child carrier may potentially be under danger.

SUMMARY OF THE INVENTION

Therefore, the object of the present invention is to provide a brake device and a child carrier provided with the brake device that can overcome the aforesaid drawback of the prior art.

According to one aspect of this invention, a brake device is adapted to be disposed at a child carrier that includes a frame and at least one wheel unit. The wheel unit includes a hub that is provided with a plurality of spokes radiating from the hub, and an axle that rotatably extends through the hub.

The brake device includes a base unit, an operable unit, a brake unit, and a positioning unit. The base unit is adapted to be connected to the frame and is formed with a first guiding groove and a through hole. The axle is adapted to extend through the base unit so as to rotatably connect the wheel unit to the base unit. The operable unit is pivotally connected to the base unit and includes at least one side wall formed with a positioning hole and a second guiding groove. The operable unit is pivotable with respect to the base unit between a brake position and a release position. The brake unit is disposed in the first and second guiding grooves, and is slidable in the first and second guiding grooves when the operable unit pivots with respect to the base unit between the brake position, where the brake unit is adapted to be disposed between adjacent two of the spokes, and the release position, where the brake unit is adapted to be separated from the spokes. The positioning unit is disposed in the through hole, and includes a positioning component and an elastic member for providing biasing force to the positioning component. The positioning hole is registered with the through hole and the positioning component engages the positioning hole when the operable unit is at the brake position, or alternatively when the operable unit is at the release position.

According to another aspect of this invention, a child carrier includes a frame, at least one wheel unit, and a brake device. The wheel unit includes a hub, a plurality of spokes radiating from the hub, and an axle that rotatably extends through the hub. The brake device includes a base unit, an operable unit, a brake unit, and a positioning unit. The base unit is connected to the frame and is formed with a first guiding groove and a through hole. The axle extends through the base unit and rotatably connects the wheel unit to the base unit. The operable unit is pivotally connected to the base unit and includes at least one side wall formed with a positioning hole and a second guiding groove. The operable unit is pivotable with respect to the base unit between a brake position and a release position. The brake unit is disposed in the first and second guiding grooves, and is slidable in the first and second guiding grooves when the operable unit pivots with respect to the base unit between the brake position, where the brake unit is disposed between adjacent two of the spokes, and the release position, where the brake unit is separated from the spokes. The positioning unit is disposed in the through hole, and includes a positioning component and an elastic member for providing biasing force to the positioning component. The positioning hole is registered with the through hole and the positioning component engages the positioning hole when the operable unit is at the brake position, or alternatively when the operable unit is at the release position.

BRIEF DESCRIPTION OF THE DRAWINGS

Other features and advantages of the present invention will become apparent in the following detailed description of the preferred embodiment of this invention, with reference to the accompanying drawings, in which:

FIG. 1 is a perspective view of a wheel unit of a child carrier provided with a preferred embodiment of a brake device according to this invention;

FIG. 7 is a side view of FIG. 6, where the operable unit is at the release position;

FIG. 9 is a side view of the assembly of the brake device and the wheel unit, where the operable unit at the brake position.

DETAILED DESCRIPTION OF THE PREFERRED EMBODIMENT

Figure 2:
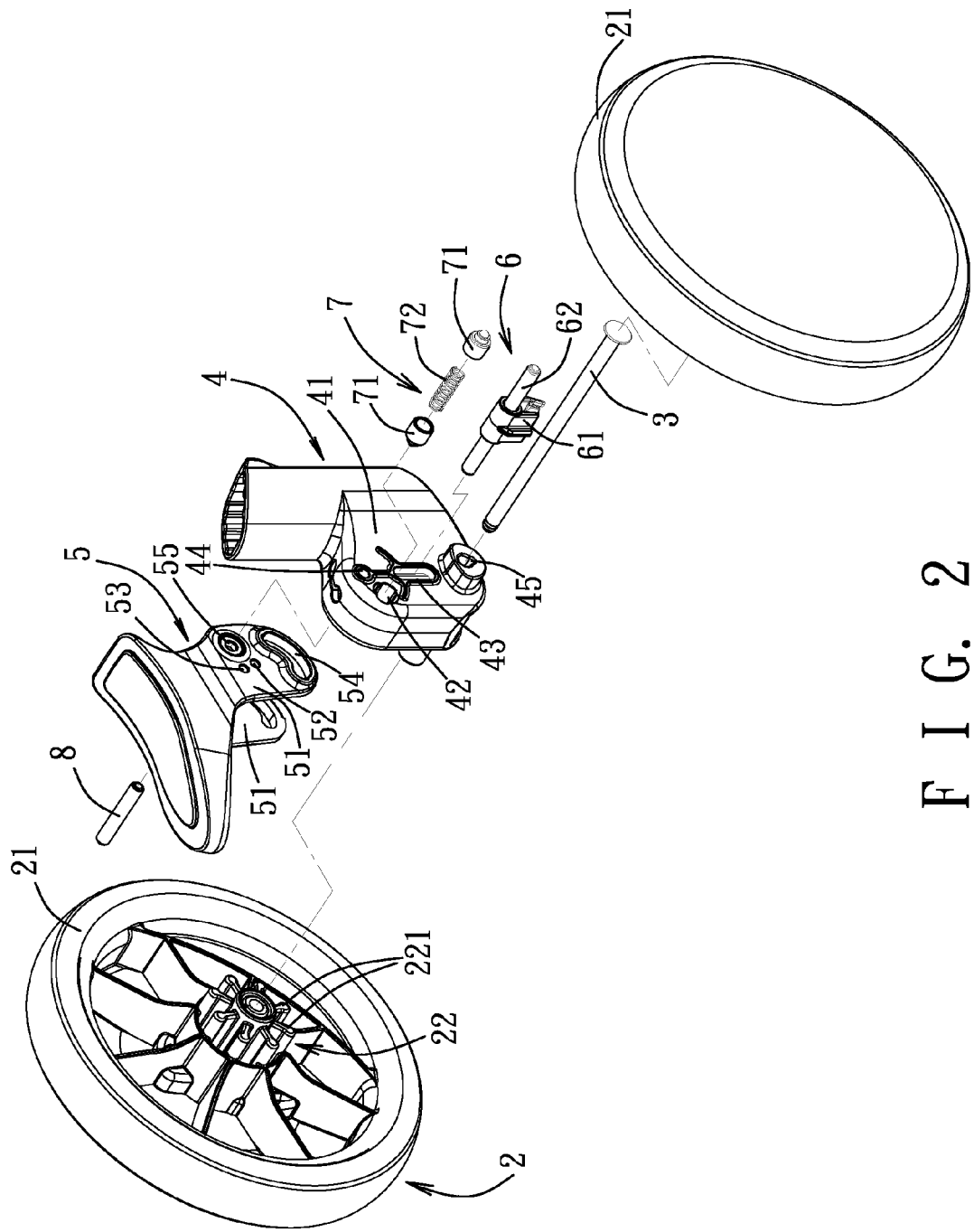
FIG. 2 is an exploded perspective view of the brake device.
Figure 3:
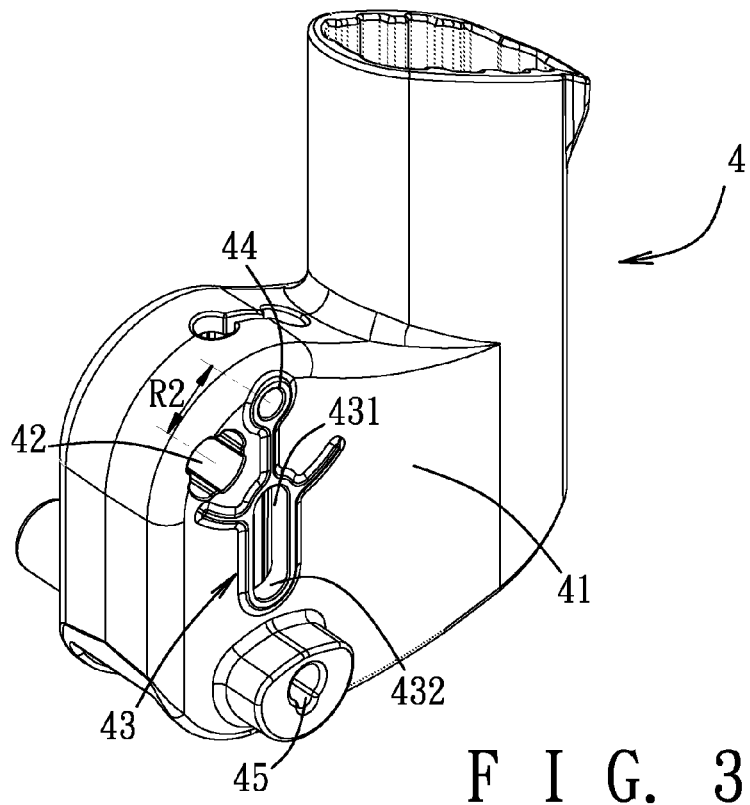
FIG. 3 is a perspective view of a base unit of the brake device.

As shown in FIGS. 1 and 2, the preferred embodiment of a brake device according to this invention is disposed on, but not limited to, a wheel unit 2 of a child carrier (for example, a rear wheel unit). In practice, the brake device can be applied to a stroller, a cart, a wagon, a pram, etc. The child carrier includes a frame 1 and a plurality of wheel units 2 (FIGS. 1 and 2 show only one of the wheel units 2). Each of the wheel units 2 includes a pair of wheels 21. Each of the wheels 21 includes a hub 22, and a plurality of spokes 221 radiating from the hub 22. Each of the wheel units 2 further includes an axle 3 rotatably extending through the hub 22. It should be noted that, in this embodiment, the brake device is disposed at the wheel unit 2 including two wheels 21 for stably braking the child carrier. However, in other embodiments, the brake device may be provided on a wheel unit 2 including only one wheel 21, and in turn only one hub 22, and can still function to brake the child carrier. The brake device includes a base unit 4, an operable unit 5, a brake unit 6, and a positioning unit 7.

As shown in FIGS. 1 to 4, the wheels 21 of the wheel unit 2 are respectively disposed on two lateral sides of the base unit 4. The base unit 4 is connected to the frame 1, and includes two side walls 41, which are spaced apart from each other, and each of which is formed with a through hole 42, a first guiding groove 43, a first shaft hole 44, and an axle hole 45. The axle 3 extends through the axle hole 45, and rotatably connects the wheel unit 2 to the base unit 4. The first guiding groove 43 is in an elongate shape and has a first end 431 distal from the axle hole 45 and a second end 432 adjacent to the axle hole 45. In this embodiment, the base unit 4 is, but not limited to, a casing.

Figure 4:
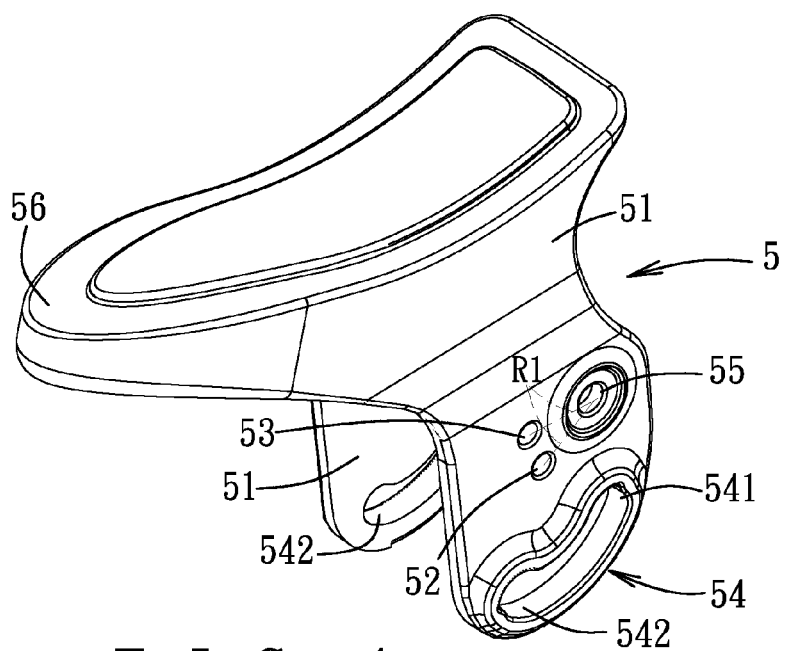
FIG. 4 is a perspective view of an operable unit of the brake device.

As shown in FIG. 4, the operable unit 5 includes two side walls 51 which are spaced apart from each other and each of which is formed with a first positioning hole 52, a second positioning hole 53, a second guiding groove 54, and a second shaft hole 55. The operable unit 5 further includes a pedal 56, and the side walls 51 are connected respectively to two lateral sides of the pedal 56. The brake device further includes a shaft 8, and the operable unit 5 is pivotally connected to the base unit 4 by extending the shaft 8 through the first and second shaft holes 44, 55. The operable unit 5 is pivotable with respect to the base unit 4 between a brake position (see FIGS. 8 and 9) and a release position (see FIGS. 6 and 7). The first and second positioning holes 52, 53 are angularly spaced apart from each other with respect to the second shaft hole 55, and a distance (R1) between each of the first and second positioning holes 52, 53 and the second shaft hole 55 is equal to a distance (R2) between the through hole 42 and the first shaft hole 44. The second guiding groove 54 is curved and inclined with respect to the first guiding groove 43, and has a first end 541 adjacent to the connection hole 55 and a second end 542 distal from the connection hole 55. When the operable unit 5 is at the release position (see FIG. 7), the first end 431 of the first guiding groove 43 is registered with the first end 541 of the second guiding groove 54, and the through hole 42 of the base unit 4 is registered with the first positioning hole 52 of the operable unit 5. When the operable unit 5 is at the brake position (see FIG. 9), the second end 432 of the first guiding groove 43 is registered with the second end 542 of the second guiding groove 54, and the through hole 42 of the base unit 4 is registered with the second positioning hole 53 of the operable unit 5.

Figure 5:
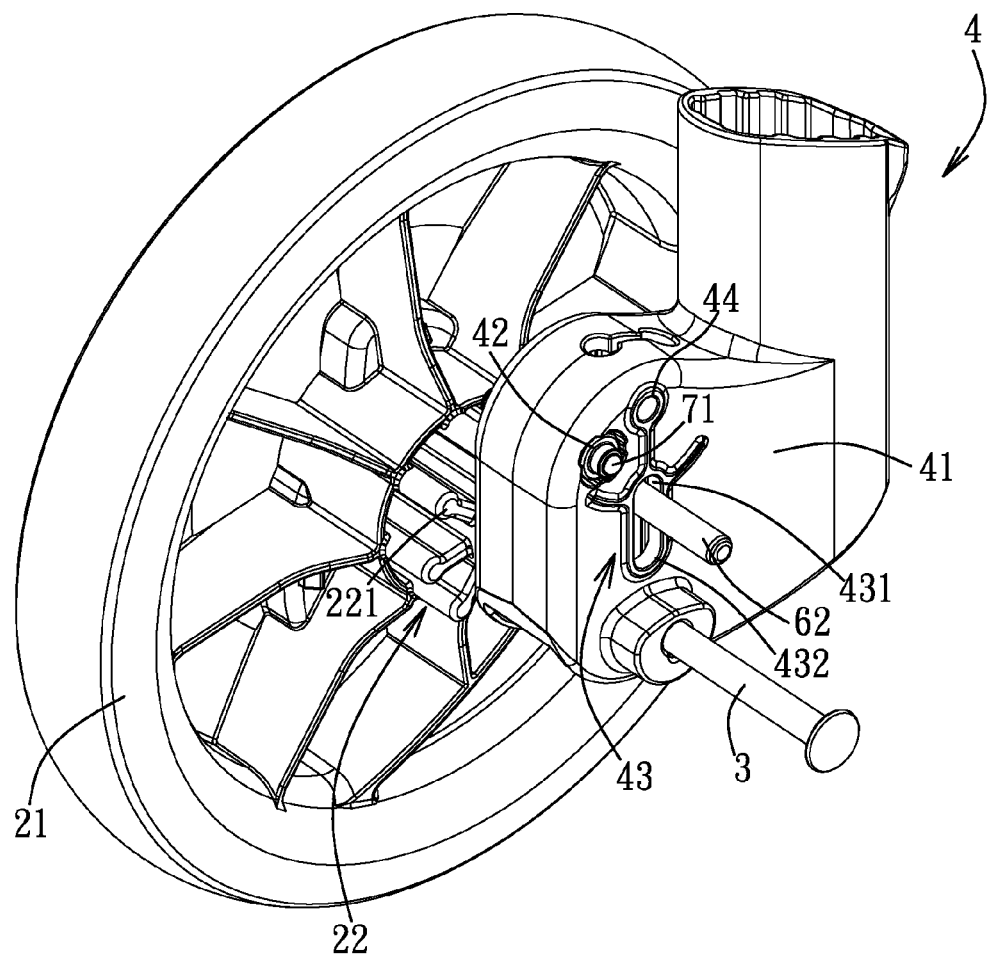
FIG. 5 is a perspective view illustrating assembly relationship between the base unit of the brake device and the wheel unit.
Figure 6:
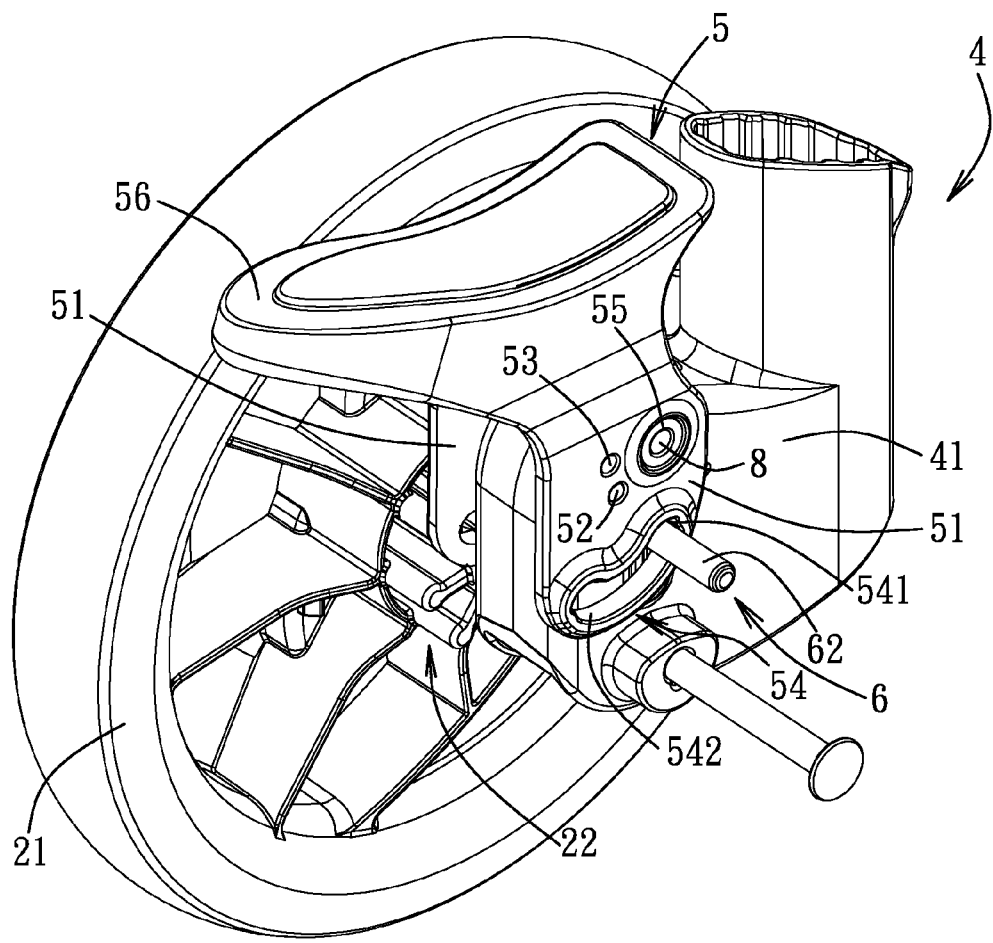
FIG. 6 is a perspective view of the assembly of the brake device and the wheel unit, where the operable unit is at a release position.

As shown in FIGS. 2, 5 and 6, the brake unit 6 includes a middle portion 61 disposed in the first guiding groove 43, and a stick portion 62 having two distal ends, each of which extends from the middle portion 61 through the first guiding groove 43 of a corresponding side wall 41 of the base unit 4 and the second guiding groove 54 of a corresponding side wall 51 of the operable unit 5. The brake unit 6 is slidable in the first and second guiding grooves 43, 54 when the operable unit 5 pivots with respect to the base unit 4 between the brake position and the release position. In the brake position, each distal end of the stick portion 62 is disposed between adjacent two of the spokes 221 of the corresponding wheel 21 and extends through the second end 432 of the first guiding groove 43 of the corresponding side wall 41, and the second end 542 of the second guiding groove 54 of the corresponding side wall 51. In the release position, each distal end of the stick portion 62 is disposed at the first end 431 of the first guiding groove 43 of the corresponding side wall 41 and the first end 541 of the second guiding groove 54 of the corresponding side wall 51 and is separated from the spokes 221 of the corresponding wheel 21. It should be noted that, in the case of the wheel unit 2 including only one hub 22, only one of the side walls 41 of the base unit 4 is formed with the first guiding groove 43 and only one of the side walls 51 of the operable unit 5 at the same side with said one of the side walls 41 of the base unit 4 is formed with the second guiding groove 43. Accordingly, the stick portion 62 of the brake unit 6 may have only one distal end that would extend through the first and second guiding grooves 43, 54.

Figure 10:
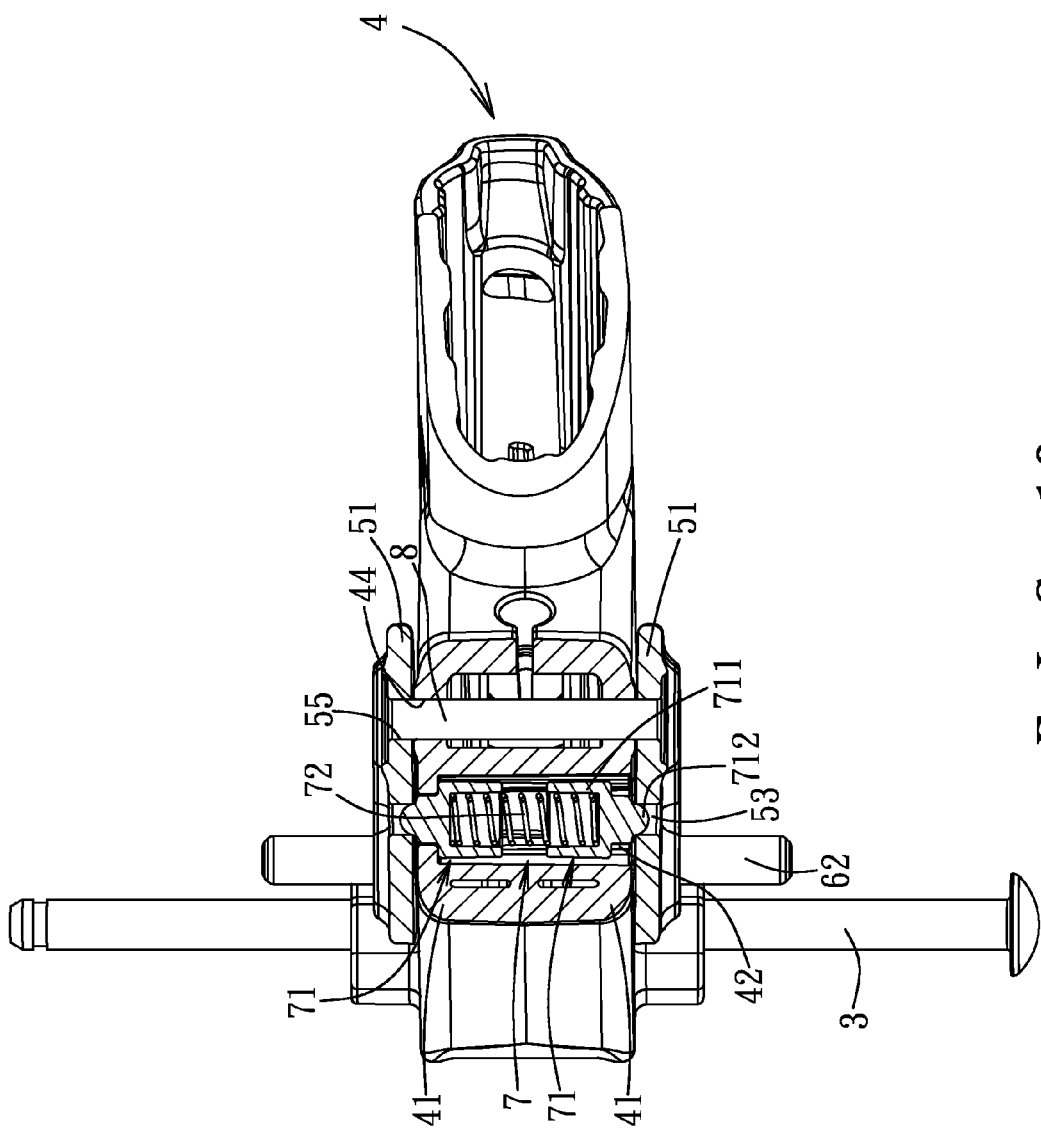
FIG. 10 is a cross-sectional view of the brake device in a brake state.

As shown in FIGS. 2, 5 and 10, the positioning unit 7 is disposed in the through hole 42, and includes a pair of positioning components 71 and an elastic member 72 for providing biasing force to the positioning components 71. The first positioning holes 52 are registered with the through hole 42 and the positioning components 71 respectively engage the first positioning holes 52 when the operable unit 5 is at the release position, and the second positioning holes 53 are registered with the through hole 42 and the positioning components 71 respectively engage the second positioning holes 53 when the operable unit 5 is at the brake position. Referring to FIG. 10, each of the positioning components 71 includes a concave portion 711 abutting against the elastic member 72, and a protruding end 712 protruding from the concave portion 711 and opposite to the elastic member 72. The concave portion 711 is disposed in the through hole 42. The protruding ends 712 of the positioning components 71 are respectively disposed in and engage the first positioning holes 52 when the operable unit 5 is at the release position, and in the second positioning holes 53 when the operable unit 5 is at the brake position. In this embodiment, the elastic member 72 is a spring. Each end of the spring is disposed in and provides the biasing force to the concave portion 711 of a corresponding positioning component 71 so as to elastically push the protruding end 712 of the positioning component 71 into the respective first or second positioning hole 52, 53. It should be noted that the positioning unit 7 can include only one positioning component 71 for positioning the operable unit 5 with respect to the base unit 4.

When the operable unit 5 is rotated with respect to the base unit 4, the elastic member 72 is compressed and the protruding end 712 of each of the positioning components 71 abuts against an inner side of the corresponding side wall 51 of the operable unit 5, and when one of the first and second positioning holes 52, 53 is registered with the through hole 42, the elastic member 72 is restored and provides the biasing force to push the positioning component 71 so that the protruding end 712 engages with said one of the first and second positioning holes 52, 53 and generates a click sound for reminding a user that the wheel unit 2 has been braked or released. The user can position the operable unit 5 at the release position or at the brake position by operating the pedal 56.

Figure 8:
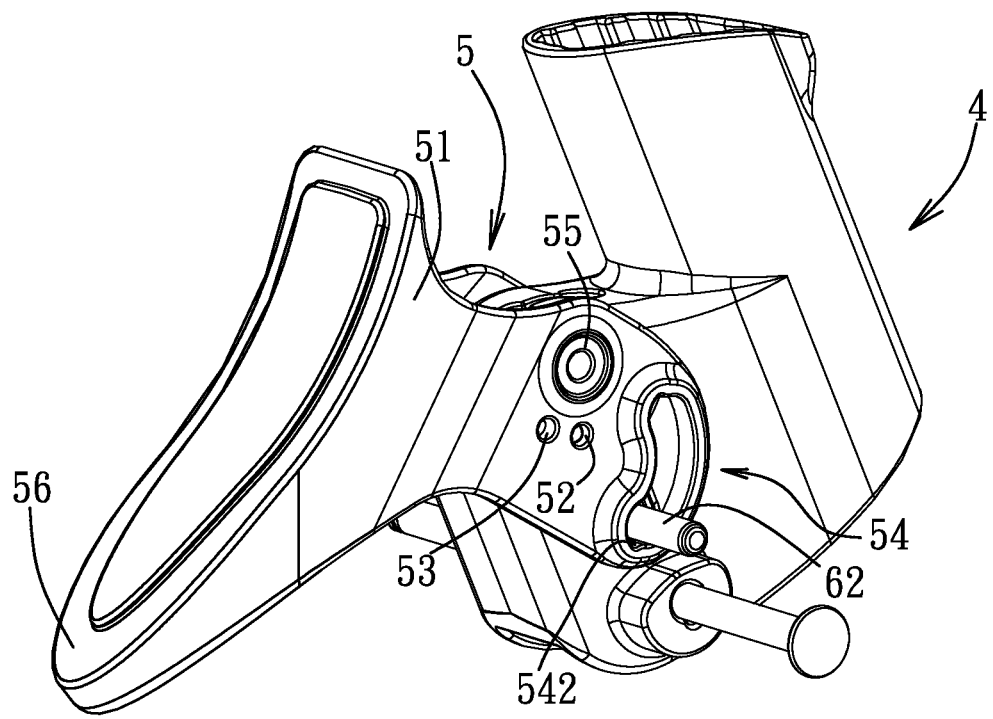
FIG. 8 is a perspective view of the brake device, where the operable unit is at a brake position.

FIGS. 6 and 7 show the brake device in a release state (i.e., when the operable unit 5 is at the release position). FIGS. 8 and 9 show the brake device in a brake state (i.e., when the operable unit 5 is at the brake position). When the user steps on the pedal 56 of the operable unit 5, the operable unit 5 is rotated downwardly with respect to the base unit 4 and moves from the release position toward the brake position. During this process, the brake unit 6 slides in the first and second guiding grooves 43, 54 from the first ends 431, 541 to the second ends 432, 542 until the brake unit 6 is disposed between adjacent two of the spokes 221 of each wheel 21 for locking the wheel unit 2 and the protruding end 712 engages the second positioning hole 53 that is registered with the through hole 42 (referring to FIGS. 9 and 10) for securing the operable unit 5 at the brake position. At this time, the brake device is disposed in the brake state.

When the user lifts up the pedal 56 of the operable unit 5, the operable unit 5 is rotated upwardly with respect to the base unit 4 and moves from the brake position toward the release position. During this process, the brake unit 6 slides in the first and second guiding grooves 43, 54 from the second ends 432, 542 to the first ends 431, 541 until the brake unit 6 is separated from the spokes 221 for releasing the wheel unit 2 and the protruding end 712 engages the first positioning hole 52 that is registered with the through hole 42 for securing the operable unit 5 at the release position. At this time, the brake device is disposed in the release state.

To sum up, the brake device of this invention is operable by a user through stepping on or lifting up the pedal 56 of the operable unit 5 so as to move between the brake and release positions. The brake unit 6 can be disposed between adjacent two of the spokes 221 of each wheel 21 for braking the child carrier, and the positioning unit 7 is capable of engaging the first or second positioning holes 52, 53 for positioning the operable unit 5 with respect to the base unit 4 at the brake or release position and for generating the click sound to remind the user that the wheel unit 2 has been braked or released.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A brake device adapted to be disposed at a child carrier that includes a frame and at least one wheel unit, the wheel unit including a hub, a plurality of spokes radiating the hub, and an axle that rotatably extends through the hub, said brake device comprising:
    a base unit adapted to be connected to the frame, formed with a first guiding groove and a through hole, and adapted to allow the axle to extend therethrough and to rotatably connect the wheel unit to said base unit;
    an operable unit pivotally connected to said base unit and including at least one side wall formed with a first positioning hole and a second guiding groove, said operable unit being pivotable with respect to said base unit between a brake position and a release position;
    a brake unit disposed in said first and second guiding grooves, and slidable in said first and second guiding grooves in a first direction when said operable unit pivots with respect to said base unit between the brake position, where said brake unit is adapted to be disposed between adjacent two of the spokes, and the release position, where said brake unit is adapted to be separated from the spokes; and
    a positioning unit disposed in said through hole in said base unit, separated from said brake unit, and including a positioning component and an elastic member for providing a biasing force to said positioning component in a second direction different from the first direction, said first positioning hole being registered with said through hole in the second direction and said positioning component engaging said first positioning hole when said operable unit is at one of the brake position and the release position.

2. The brake device as claimed in claim 1, wherein said base unit is a casing that includes at least one side wall formed with said first guiding groove and further formed with an axle hole allowing the axle of the wheel unit to extend therethrough, said first guiding groove being in an elongate shape and having a first end distal from said axle hole and a second end adjacent to said axle hole.

3. The brake device as claimed in claim 2, wherein said second guiding groove is inclined with respect to said first guiding groove and has a first end registered with said first end of said first guiding groove when said operable unit is at the release position, and a second end registered with said second end of said first guiding groove when said operable unit is at the brake position.

4. The brake device as claimed in claim 3, wherein said brake unit slides in said first and second guiding grooves from said first ends to said second ends when said operable unit pivots with respect to said base unit from the release position to the brake position, and slides in said first and second guiding grooves from said second ends to said first ends when said operable unit pivots with respect to said base unit from the brake position to the release position.

5. The brake device as claimed in claim 1, further comprising a shaft, said operable unit being pivotally connected to said base unit through said shaft, said side wall of said operable unit being further formed with a second positioning hole that is angularly spaced apart from said first positioning hole, a distance between said first positioning hole and said shaft being equal to a distance between said second positioning hole and said shaft.

6. The brake device as claimed in claim 5, wherein said second positioning hole is registered with said through hole in said base unit when said operable unit is at the other of the brake position and the release position.

7. The brake device as claimed in claim 5, wherein said positioning component engages said first positioning hole when said operable unit is at the release position, and said positioning component engages said second positioning hole when said operable unit is at the brake position.

8. The brake device as claimed in claim 1, wherein said positioning component has a protruding end opposite to said elastic member, and said protruding end is disposed in and engages said first positioning hole in said side wall of said operable unit when said operable unit is at one of the brake position and the release position.

9. The brake device as claimed in claim 1, wherein said base unit is a casing that includes a pair of side walls spaced apart from each other and respectively formed with said first guiding grooves, and said operable unit includes a pair of said side walls spaced apart from each other and respectively formed with said second guiding grooves.

10. The brake device as claimed in claim 1, wherein said brake unit is a stick having a pair of distal ends extending through said base unit and said side walls of said operable unit.

11. The brake device as claimed in claim 1, wherein one side of said positioning component abuts against said elastic member and the other side of said positioning component abuts against an inner side of said side wall of said operable unit when said operable unit is rotated with respect to said base unit.

12. A child carrier comprising:
    a frame;
    at least one wheel unit including a hub, a plurality of spokes radiating from said hub, and an axle that rotatably extends through said hub; and
    a brake device including
        a base unit that is connected to said frame and that is formed with a first guiding groove and a through hole, said axle extending through said base unit and rotatably connecting said wheel unit to said base unit, an operable unit that is pivotally connected to said base unit and that includes at, least one side wall formed with a first positioning hole and a second guiding groove, said operable unit being pivotable with respect to said base unit between a brake position and a release position, a brake unit that is disposed in said first and second guiding grooves, and that is slidable in said first and second guiding grooves in a first direction when said operable unit pivots with respect to said base unit between the brake position, where said brake unit is disposed between adjacent two of said spokes, and the release position, where said brake unit is separated from said spokes, and a positioning unit that is disposed in said through hole in said base unit, that is separated from said brake unit, and that includes a positioning component and an elastic member for providing a biasing force to said positioning component in a second direction different from the first direction, said first positioning hole being registered with said through hole in the second direction and said positioning component engaging said first positioning hole when said operable unit is at one of the brake position and the release position.

13. The child carrier as claimed in claim 12, wherein said base unit is a casing that includes at least one side wall formed with said first guiding groove and an axle hole through which said axle of said wheel unit extends, said first guiding groove being in an elongate shape and having a first end distal from said axle hole and a second end adjacent to said axle hole.

14. The child carrier as claimed in claim 13, wherein said second guiding groove is inclined with respect to said first guiding groove and has a first end registered with said first end of said first guiding groove when said operable unit is at the release position, and a second end registered with said second end of said first guiding groove when said operable unit is at the brake position.

15. The child carrier as claimed in claim 14, wherein said brake unit slides in said first and second guiding grooves from said first ends to said second ends when said operable unit pivots with respect to said base unit from the release position to the brake position, and slides in said first and second guiding grooves from said second ends to said first ends when said operable unit pivots with respect to said base unit from the brake position to the release position.

16. The child carrier as claimed in claim 12, wherein said brake device further includes a shaft, said operable unit being pivotally connected to said base unit through said shaft, said side wall of said operable unit being further formed with a second positioning hole that is angularly spaced apart from said first positioning hole, a distance between said first positioning hole and said shaft being equal to a distance between said second positioning hole and said shaft.

17. The child carrier as claimed in claim 16, wherein said second positioning hole is registered with said through hole in said base unit when said operable unit is at the other of the brake position and the release position.

18. The child carrier as claimed in claim 16, wherein said positioning component engages said first positioning hole when said operable unit is at the release position, and said positioning component engages said second positioning hole when said operable unit is at the brake position.

19. The child carrier as claimed in claim 12, wherein said positioning component has a protruding end opposite to said elastic member, said protruding end being disposed in and engaging said first positioning hole in said side wall of said operable unit when said operable unit is at said one of the brake position and the release position.

20. The child carrier as claimed in claim 12, wherein said base unit is a casing that includes a pair of said side walls spaced apart from each other and each formed with said first guiding groove, and said operable unit includes a pair of said side walls spaced apart from each other and each formed with said second guiding groove.

21. The child carrier as claimed in claim 20, wherein said brake unit is a stick having a pair of distal ends each of which extends through said base unit and a corresponding one of said side walls of said operable unit.

22. The child carrier as claimed in claim 12, wherein one side of said positioning component abuts against said elastic member and the other side of said positioning component abuts against an inner side of said side wall of said operable unit when said operable unit is rotated with respect to said base unit.

\* \* \* \* \*